US011297601B2

United States Patent
Liu et al.

(10) Patent No.: US 11,297,601 B2
(45) Date of Patent: Apr. 5, 2022

(54) RESOURCE ALLOCATION METHOD AND ORCHESTRATOR FOR NETWORK SLICING IN THE WIRELESS ACCESS NETWORK

(71) Applicant: Alcatel Lucent, Nozay (FR)

(72) Inventors: Yifei Liu, Shanghai (CN); Haobo Xing, Shanghai (CN); Xiaoxing Han, Shanghai (CN); Jing Xia, Shanghai (CN); Xiaogen Jiang, Shanghai (CN); Min Zhang, Shanghai (CN)

(73) Assignee: Alcatel Lucent, Nozay (FR)

( * ) Notice: Subject to any disclaimer, the term of this patent is extended or adjusted under 35 U.S.C. 154(b) by 249 days.

(21) Appl. No.: 16/478,956

(22) PCT Filed: Jan. 17, 2018

(86) PCT No.: PCT/IB2018/000122
§ 371 (c)(1),
(2) Date: Apr. 9, 2020

(87) PCT Pub. No.: WO2018/134684
PCT Pub. Date: Jul. 26, 2018

(65) Prior Publication Data
US 2020/0252908 A1  Aug. 6, 2020

(30) Foreign Application Priority Data
Jan. 18, 2017  (CN) .......................... 201710040101.5

(51) Int. Cl.
*H04W 72/02*  (2009.01)
*H04W 4/70*  (2018.01)
(Continued)

(52) U.S. Cl.
CPC ........ *H04W 72/02* (2013.01); *G06F 9/45558* (2013.01); *H04W 4/70* (2018.02);
(Continued)

(58) Field of Classification Search
CPC ....... H04W 72/02; H04W 4/70; H04W 48/18; H04W 72/0493; H04W 28/16;
(Continued)

(56) References Cited

U.S. PATENT DOCUMENTS

2013/0303114 A1  11/2013  Saad et al.
2016/0352645 A1  12/2016  Senarath et al.
2017/0257886 A1*  9/2017  Adjakple ................ H04L 67/10

FOREIGN PATENT DOCUMENTS

WO  2016192637 A1  12/2016

OTHER PUBLICATIONS

Iaesi et al., "Update of use case 5.2 Network slicing," $3^{rd}$ Generation Partnership Project (3GPP), 3GPP TSG-SA WG1 Meeting #71 bis ad-hoc, S1-153029, 3 pages, XP051033793, Vancouver, Canada, Oct. 19-21, 2015.
(Continued)

*Primary Examiner* — Diane D Mizrahi
(74) *Attorney, Agent, or Firm* — Fay Sharpe LLP (57) ABSTRACT

A resource allocation method for network slicing and an orchestrator, comprising: uniformly incorporating resources originally bundled statically with the base station into a dynamic resource pool; allocating, by an orchestrator, resources from among the dynamic resource pool for the network slicing based on different network slicing requirements. A static corresponding/mapping relationship between the hardware/radio resources and the base station is broken, such that hardware/radio resources (e.g., radio access network Virtual Network Function (RAN VNF), baseband unit (BBU), RRH (Remote Radio Head) as well as antenna) that originally corresponded to different base stations will be organized as an integrated and dynamic hardware/radio resource pool and reported to the orchestrator, such that the orchestrator will centrally manage all hardware/radio resources in this pool and then sufficiently utilize and
(Continued)

dynamically orchestrate these hardware/radio resources based different needs from the network slicing.

15 Claims, 6 Drawing Sheets

(51) Int. Cl.
    *G06F 9/455*     (2018.01)
    *H04W 48/18*     (2009.01)
    *H04W 72/04*     (2009.01)

(52) U.S. Cl.
    CPC ....... *H04W 48/18* (2013.01); *H04W 72/0493* (2013.01); *G06F 2009/45595* (2013.01)

(58) Field of Classification Search
    CPC .............. H04W 16/10; H04W 72/1205; G06F 9/45558; G06F 2009/45595; H04L 41/5025; H04L 41/0896
    See application file for complete search history.

(56) References Cited

OTHER PUBLICATIONS

CATT, Consideration on RAN slicing support, 3$^{rd}$ Generation Partnership Project (3GPP), 3GPP TSG RAN WG2 Meeting Ad Hoc, R2-1700225, pp. 1-5, XP051210808, Spokane, USA, Jan. 17-19, 2017.

International Search Report for PCT/IB2018/000122 dated Jun. 1, 2018.

PCT Patent Application No. PCT/IB2018/000122, Written Opinion of the International Searching Authority, dated Jun. 1, 2018, 6 pages.

Carella et al., Cross-Layer Service To Network Orchestration, IEEE ICC 2015—Communications Software, Services and Multimedia Applications Symposium, 2015, pp. 6829-6835.

* cited by examiner

Capability of Radio Access VNF

Service Type 1
(Signalling for basic coverage)
* The maximum number of users ;
* the maximum data volume for busy hour ;
* The maximum number of VNFinstance ;

Service Type 2
(eMBB)
* The maximum number of users ;
* the maximum data volume for busy hour ;
* The maximum number of VNFinstance ;

Service Type 3
(mMTC)
* The maximum number of users ;
* the maximum data volume for busy hour ;
* The maximum number of VNFinstance ;

Service Type 4
(uRLLC)
* The maximum number of users ;
* the maximum data volume for busy hour ;
* The maximum number of VNFinstance ;

Capability of BBU

*Supported type of radio access technology (2G/3G/4G/5G);
*Supported service type list :
Service type 1: Signalling (For basic coverage):
- Required number of BBU node for signalling ;
- Service type 2: eMBB :
  - Required number of BBU node for eMBB;
- Service type 3: mMTC :
  - Required number of BBU node for mMTC;
- Service type 4: uRLLC :
  - Required number of BBU node for uRLLC;
- ......

FIG. 4

Capability of RRH

*RRH attribution:
- Supported radio access technology (2G/3G/4G/5G);
- Band/Frequency/Bandwidth/Path number ;
- Supported carrier number per RRH ;
- Coverage(longitude, latitude);

*Supported service type list:
- Service type 1:
- Service type 2:
- Service type 3:
- Service type 4:
- ......

RESOURCE ALLOCATION METHOD AND ORCHESTRATOR FOR NETWORK SLICING IN THE WIRELESS ACCESS NETWORK

FIELD

The present disclosure generally relates to network slicing in a wireless network, and more particularly to a method and apparatus for network slicing in a radio access network (RAN).

BACKGROUND

Currently, network slicing is a very hot topic in the discussion of 3GPP 5G. Network slicing is mostly discussed in 5G. Network operators such as KT, SK Telecom, China Mobile, DT, KDDI, and NTT and device manufacturers such as Ericsson, Nokia, and Huawei all believe that network slicing is an ideal network architecture in the 5G era. This novel technology enables an operator to slice a hardware infrastructure into a plurality of virtual end-to-end network, where individual network slicings are logically isolated between a device, an access network, a transmission network, and a core network, thereby being adapted to different characteristic needs of various types of businesses.

Till the current 4G network, the mobile network mainly serves mobile phones, where generally only some optimizations are made to mobile phones. However, in the 5G era, the mobile network needs to serve various types of devices and various demands. Application scenarios for 5G which are mentioned relatively frequently include: mobile broadband, large-scale of IoT (Internet of Things), and task-critical IoT. They all need different types of networks and have different requirements on mobility, charging, security, policy control, delay, and reliability, etc. For example, a large-scale IoT service is connected to fixed sensors to measure temperature, humidity, and precipitation, etc. Those characteristics that mainly serve handover, location update and the like of mobile phones in the mobile network will not be needed any more. In addition, the task-critical IoT services such as auto driving and remote robot control requires an end-to-end delay of only several milliseconds, which is largely different from mobile broadband services.

For each network slicing, dedicated resources such as virtual server, network bandwidth, and service quality are all sufficiently guaranteed. Due to mutual isolation between slicings, error or fault of one slicing will not affect communications of other slicings.

Traditional hardware and radio access network equipment such as BBU (Base Band Unit), RRH (Remote Radio Head) and antenna have to belong to a certain base station. This kind of static mapping between hardware/radio resources and the base station can't fulfill the requirement about creating, updating and deleting a network slicing dynamically, which is the key character of 5G network slicing. At the same time, such kind of static mapping can't make full use of hardware/radio resources either. Furthermore, due to existence of such static mapping, the workload of network planning is quite high.

By far, most discussions about network slicing are related to the core network, while fewer discussions are focusing on network slicing of RAN (radio access network); especially there is no practical solution to model the hardware and radio resources as inputs of an orchestrator.

SUMMARY

In view of the above problems existing in the prior art, embodiments of the present disclosure provide a solution for setting up a resource model for network slicing. Specifically, a static corresponding/mapping relationship between the hardware/radio resources and the base station is broken, such that hardware/radio resources (e.g., radio access network VNF (Virtual Network Function), baseband unit (BBU), RRH (Remote Radio Head) as well as antenna) that originally corresponded to different base stations will be organized as an integrated and dynamic hardware/radio resource pool and reported to the orchestrator, such that the orchestrator will centrally manage all hardware/radio resources in this pool and then sufficiently utilize and dynamically orchestrate these hardware/radio resources based different needs from the network slicing.

An aspect of the present disclosure provides a resource allocating method for network slicing, comprising: a. uniformly incorporating resources originally bundled statically with the base station into a dynamic resource pool; b. allocating, by an orchestrator, resources from among the dynamic resource pool for the network slicing based on different network slicing requirements.

According to a specific embodiment of the first aspect, the step a further comprises: when a new resource is available for the dynamic resource pool, initiating, by a network device where the new resource is located, a report to a network side; and updating the dynamic resource pool based on the report.

According to a specific embodiment of the first aspect, in the step b, resources serving different service types in the dynamic resource pool are allocated independent of each other.

According to a specific embodiment of the first aspect, the resources include at least one of the following: a virtual network function (VNF), a baseband unit (BBU), a remote radio head (RRH), and an antenna.

According to a specific embodiment of the first aspect, the method is adapted to network slicing of a radio access network.

According to a second aspect of the present disclosure, an orchestrator in a wireless network is provided, comprising: a first unit configured to uniformly incorporate resources originally bundled statically with the base station into a dynamic resource pool; and a second unit configured to allocate resources from among the dynamic resource pool for the network slicing based on different network slicing requirements.

According to a specific embodiment of the second aspect, the first unit is further configured to: when a new resource is available for the dynamic resource pool, obtain a report that is initiated by a network device where the new resource is located to a network side; and update the dynamic resource pool based on the report.

According to a specific embodiment of the second aspect, the second unit is further configured to allocate resources serving different service types in the dynamic resource pool independent of each other.

According to a specific embodiment of the second aspect, the resources include at least one of the following: a virtual network function (VNF), a baseband unit (BBU), a remote radio head (RRH), and an antenna.

According to a specific embodiment of the second aspect, the orchestrator is adapted to network slicing of a radio access network.

According to a third aspect of the present disclosure, there is provided a wireless network comprising the orchestrator mentioned above.

Compared with the prior art, the method and apparatus according to the embodiments of the present disclosure enable an orchestrator to manage and sufficiently utilize the hardware resources and radio resources based on different needs of respective network slicing by modeling the hardware resources and radio resources, thereby making network slicing of the radio access network feasible. Meanwhile, the workload caused by network planning will also be significantly lowered, and the processing capacities of the network device are saved, etc.

BRIEF DESCRIPTION OF THE DRAWINGS

Other features, objectives, and advantages of the present disclosure will become more apparent through reading detailed description of the non-limiting embodiments with reference to the accompanying drawings.

In the accompanying drawings, same or like references represent same or similar components.

DETAILED DESCRIPTION OF EMBODIMENTS

Taking eMBB (enhanced Mobile Broad Band), mMTC (Massive Machine Type Communication), uRLLC (Ultra-Reliable Low latency Communication) and signaling for the basic coverage as a typical example, due to the huge differences between the four services, the resource consumptions of these four services are also quite different, to divide the required resources into the individual slices and manage every slice separately will fit the diversified requirement of every service to perfection. The example of the context in the present disclosure mainly involves the following four typical resources. Those skilled in the art understand that other radio resources and hardware resources may be subject to a similar modelling and uniform management and allocation according to this manner.

The four exemplary radio resources include: RAN VNF resource, BBU resource, RRH resource, and antenna resource. Under the premise of not causing ambiguity, these resources are also called RAN VNF (or VNF), BBU, RRH and antenna for short.

Figure 1:
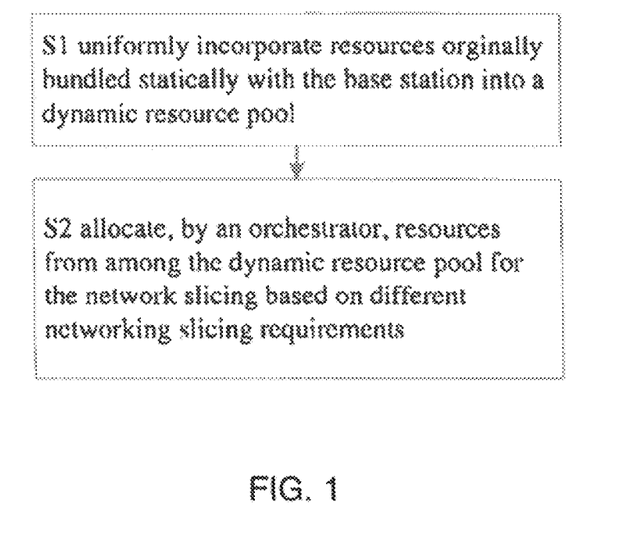
FIG. 1 shows a flow diagram of a resource allocation method for network slicing according to an embodiment of the present disclosure.

FIG. 1 illustrates a brief flow diagram of a resource allocation method for network slicing according to the present disclosure. The method is typically applied to network slicing of a radio access network, thereby filling the blank left due to only focusing the core network in the prior art.

In step S1, the resources originally statically bundled with the base station into a dynamic resource pool. The resources here include, but no limited to, the hardware and/or radio resources mentioned above, wherein the radio resources for example refer to one or more in the four examples above.

In step S2, the orchestrator allocates resources for the network slicing from among the dynamic resource pool based on demand of different network slices, wherein the different network slicings may refer to at least one of the following: a network slicing for eMBB, a network slicing for mMTC, a network slicing for uRLLC, and a network slicing for signaling for the basic coverage.

FIGS. 3-6 show models established for the 4 kinds of radio resources.

Modelling for VNF Resources

Figure 3:
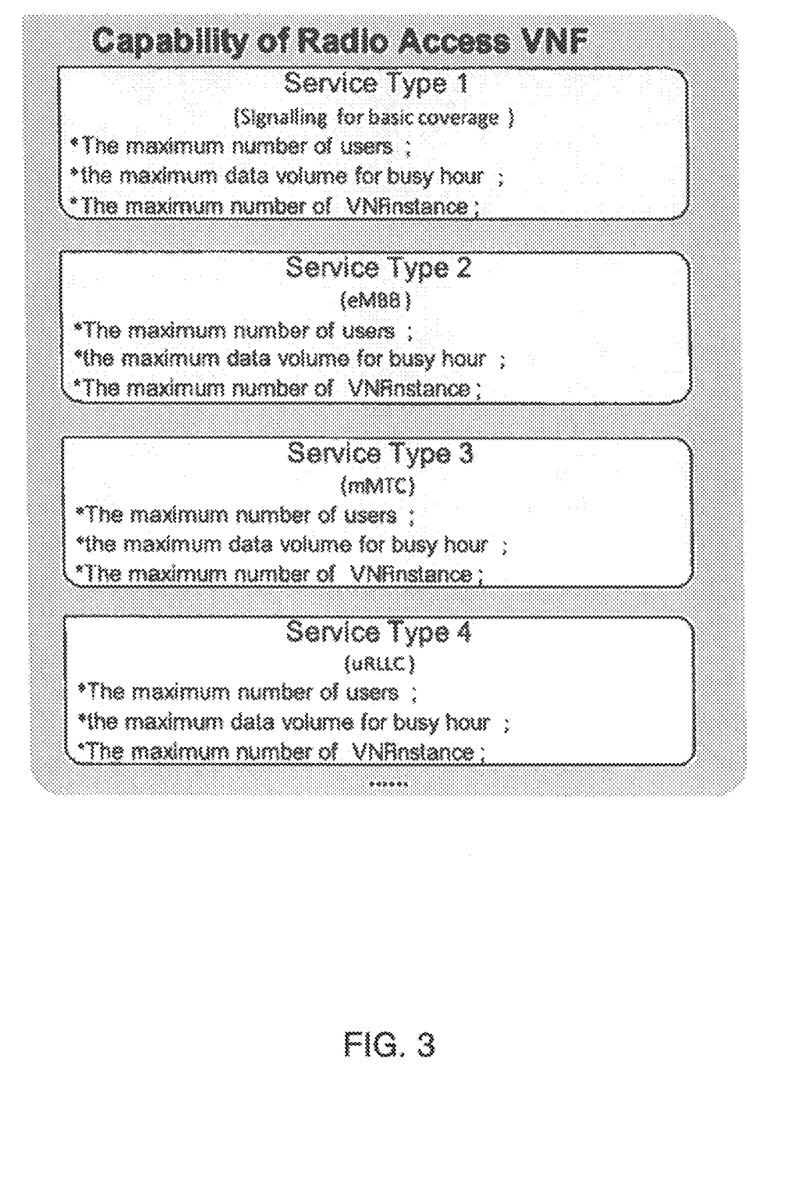
FIG. 3 shows a model established for RAN VNF resources according to an embodiment of the present disclosure.

In the VNF resource model, the following parameters are defined for each service (corresponding to a network slicing, respectively) supported by the VNF resource: maximum number of users, maximum data volume for busy hour, and the maximum number of VNF instance.

Modeling for BBU Resources

Figure 4:
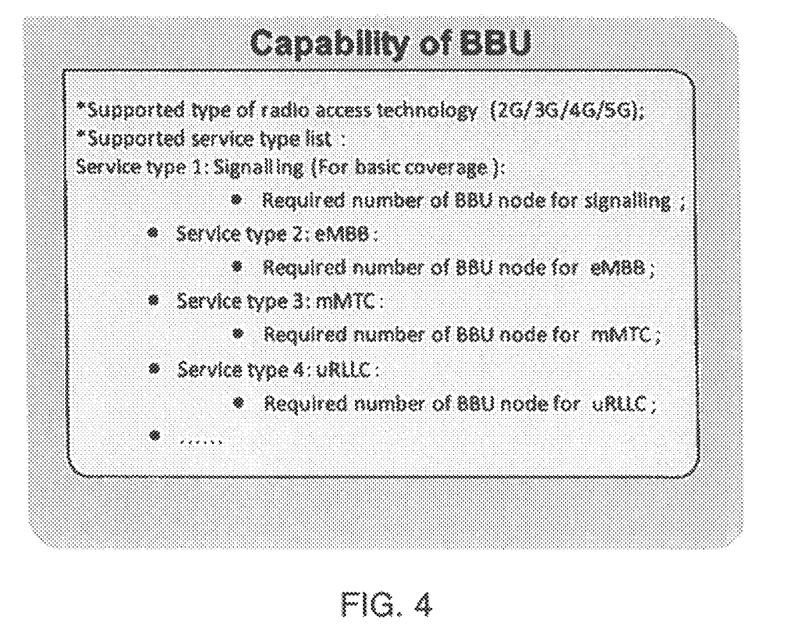
FIG. 4 shows a model established for BBU resources according to an embodiment of the present disclosure.

In the modelling for BBU resources, the following parameters and information need to be defined for each service (corresponding to a network slicing, respectively) supported by the BBU resource: the supported type of radio access technology (such as 2G, 3G, 4G or 5G etc.) and the number of BBU nodes for corresponding service.

Modelling for RRH Resources

Figure 5:
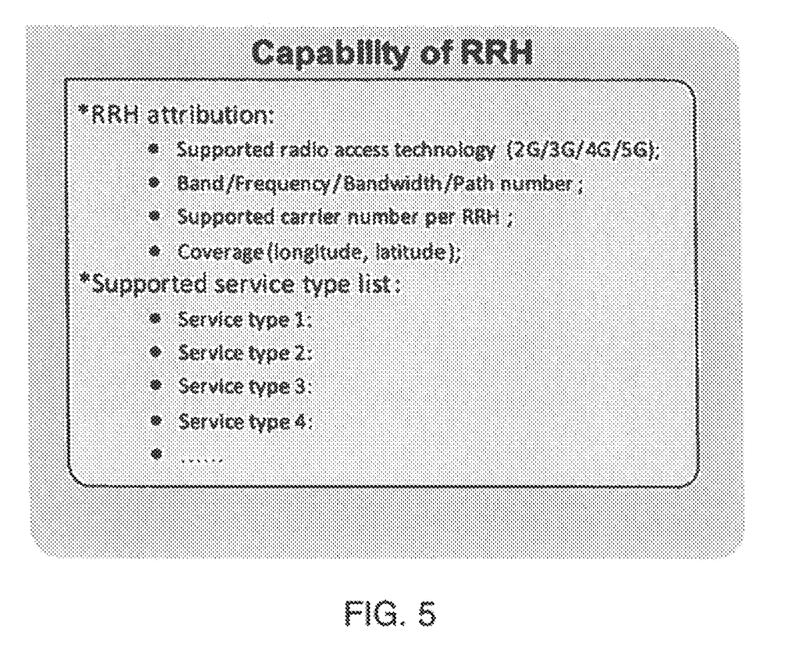
FIG. 5 shows a model established for RRH resources according to an embodiment of the present disclosure.

The usage of RRH is quite related to the spectrum planning of the user. Therefore, every RRH resource node needs to report its attribution, such as the supported radio access technology (such as 2G, 3G, 4G or 5G etc.), the supported spectrum band, spectrum frequency, bandwidth, the path number and also the maximum number of carriers for every RRH. Also, RRH may report the supported service type.

Modelling for Antenna Resources

Figure 6:
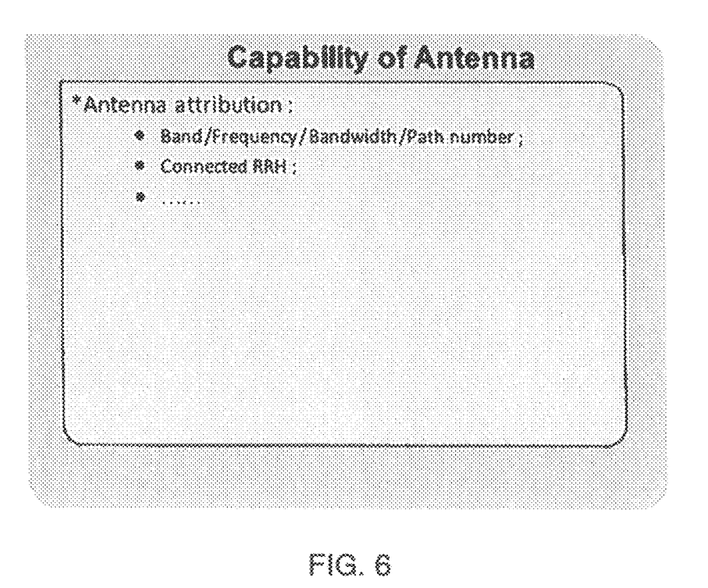
FIG. 6 shows a model established for antenna resources according to an embodiment of the present disclosure.

In most times, the usage of antenna resources is bundled with the usage of RRH. At first, the availability of the antenna is constrained to the physical connection with RRH; therefore, every antenna resource node needs to report the connected RRH ID, and also the supported spectrum band, spectrum frequency, bandwidth and the path number, etc.

It needs to be noted that different network slicings may be mapped to a same RAN VNF or to different RAN VNFs, which are specifically determined by the orchestrator in conjunction with deployment demands and the maximum processing capacity of the VNF.

Report of the above information may occur in step S1 shown in FIG. 1.

Figure 2:
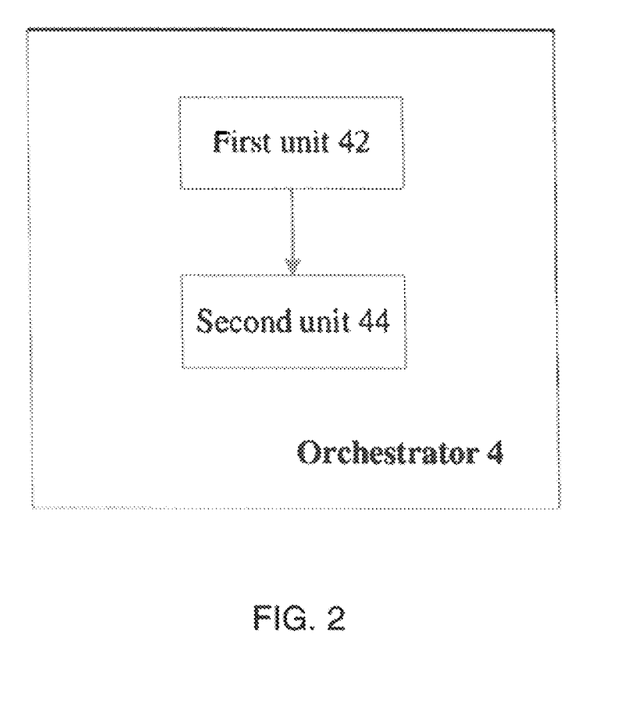
FIG. 2 shows a modular block diagram of an orchestrator for network slicing according to an embodiment of the present disclosure.

FIG. 2 shows a modular block diagram of an orchestrator 4 for network slicing according to an embodiment of the present disclosure. As shown in the figure, the orchestrator 4 comprises a first unit 42 and a second unit 44, wherein the first unit 42 is configured to uniformly incorporate resources originally bundled statically with the base station into a dynamic resource pool, corresponding to the content in step S1 of the method shown in FIG. 1; and the second unit 44 is configured to allocate resources from among the dynamic resource pool for the network slicing based on different network slicing requirements, corresponding to the content in step S2 of the method corresponding to FIG. 1.

Specifically, the first unit 42 is further configured to when a new resource is available for the dynamic resource pool, obtain a report that is initiated by a network device where the new resource is located to a network side; and update the dynamic resource pool based on the report.

Figure 7:
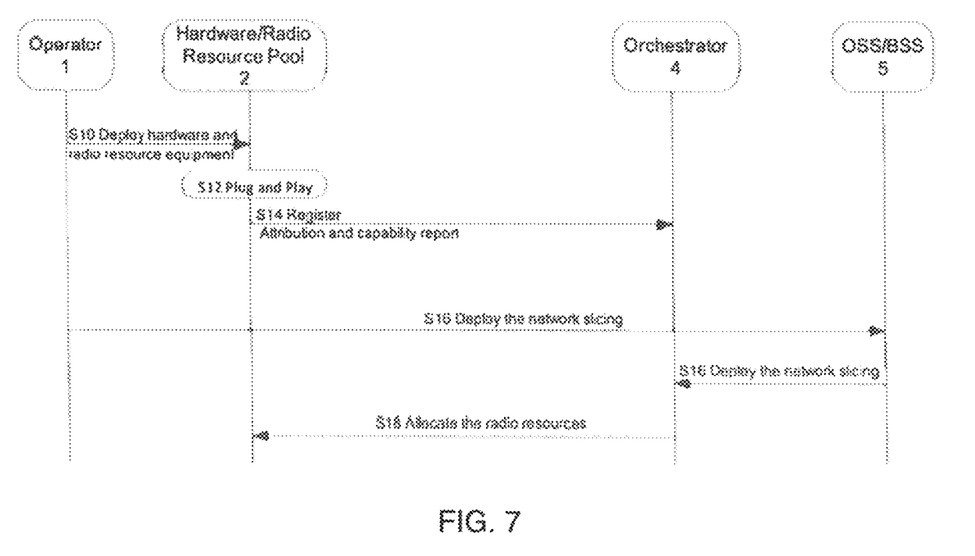
FIG. 7 shows a flow diagram of implement plug-and-play of a new device and creating network slicing according to an embodiment of the present disclosure.

FIG. 7 shows a flow diagram of implement plug-and-play of a new device according to an embodiment of the present disclosure; specifically, it is embodied as automatic orchestration of hardware and/or radio resources, i.e., plug-and-play.

Based on the modeling for various resources as shown in flow diagram 1 and FIGS. 3-6, when a new resource node (i.e., a device providing new hardware and/or radio resources) is added to the network (S10 and S12), the capability and attribute of at least of RAN VNF, BBU, RRH, and antenna resource pool need to be reported to the orchestrator based on the contents shown in FIGS. 3-6 (S14). Based on the report from the RAN, the orchestrator (see relevant descriptions regarding FIG. 1 and FIG. 2) may update the information of various resources in the dynamic resource pool, thereby uniformly managing and sufficiently utilizing all hardware and/or radio resources and implementing network slicing (S16, S2).

Therefore, when the user (e.g., operator) needs to add a new network slicing type due to business development requirements, the user may deploy/add such a hardware/radio resource node in the step S10; after the device is opened, the user inputs the business requirements (e.g., maximum number of users, maximum data volume for busy hour, etc.) to the orchestrator 4 through the plug-and-play step in the step S12. The orchestrator 4 will merge the business needs from the operator and the reports from resource nodes to collectively orchestrate all resources, thereby sufficiently utilizing all hardware and/or radio resources and sufficiently reducing the workload of network planning.

Figure 8A:
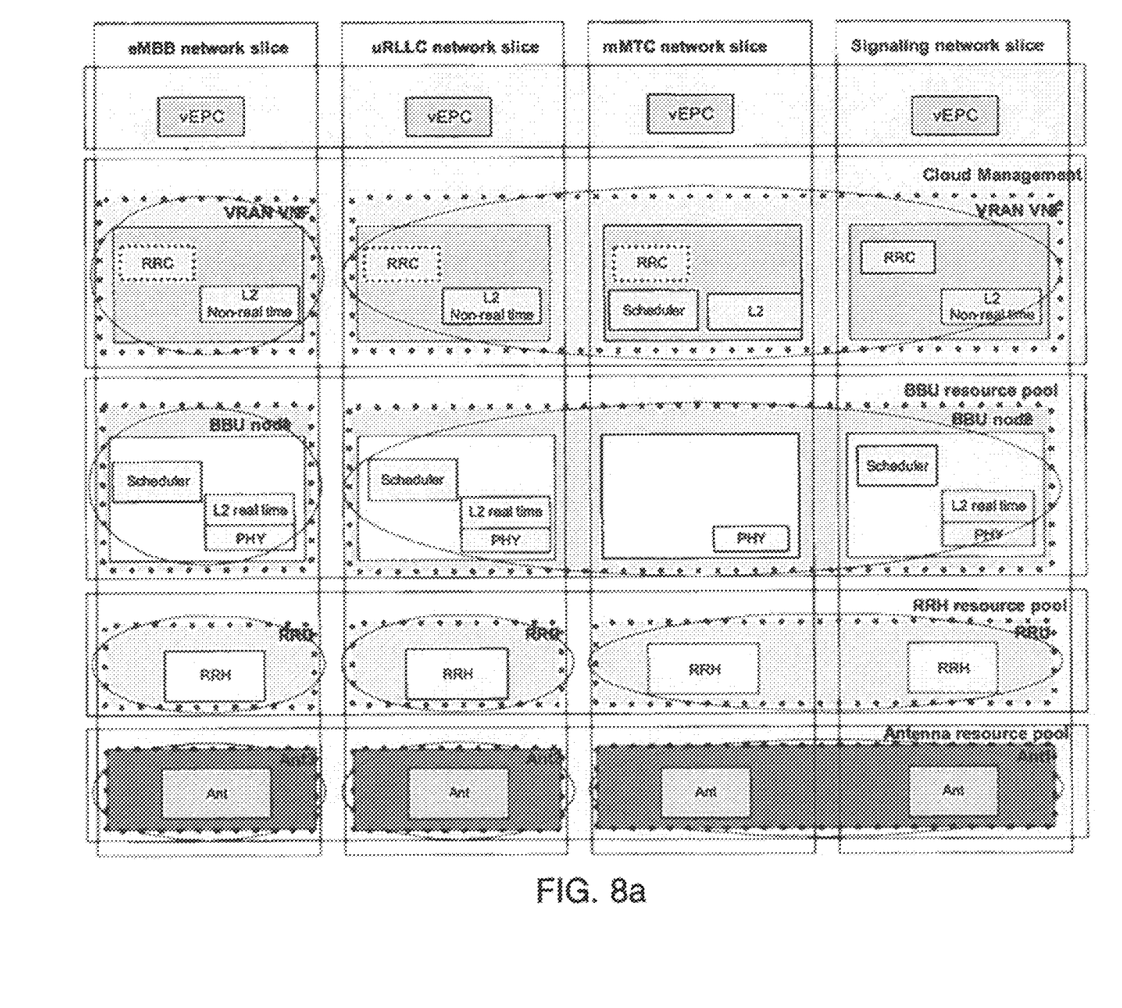
FIG. 8a shows an example of allocating resources from among a dynamic resource pool according to an embodiment of the present disclosure.
Figure 8B:
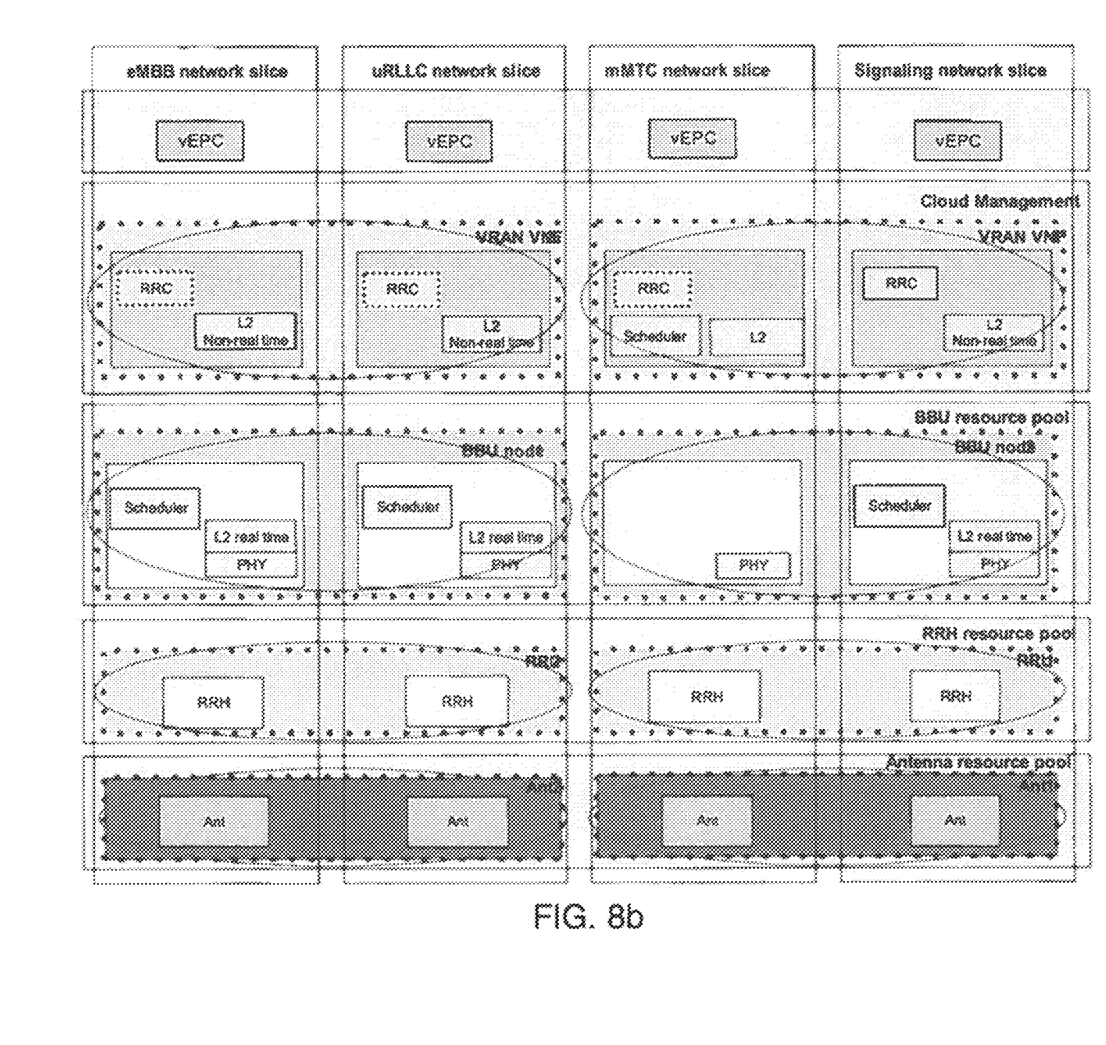
FIG. 8b shows another example of allocating resources from among a dynamic resource pool according to an embodiment of the present disclosure.

FIGS. 8a and 8b show two different examples of allocating resources in a centralized dynamic resource pool, wherein an elliptic curve circles a certain radio resource from a resource node. It is seen that in different examples (e.g., based on the configuration from the operator and/or based on a report from the network node), the actual resources corresponding to the network slices will become very flexible. As an example, in FIG. 8a, the three sets of resources (VNF2, BBU node 1, and RRU3 and Ant3) are allocated to the eMBB network slice, while VNF1 and BBU node 2 are allocated to be shared among the other three types of services, while in FIG. 8b, due to changes of resource demands and attribute report, the relationship between the resource node and the network slicing will be re-established and updated such that the resources are utilized most sufficiently.

It should be noted that some exemplary embodiments are described as processes or methods depicted as flow diagrams. Although the flow diagrams describe various operations as sequential processing, many operations therein may be implemented in parallel, concurrently or simultaneously. Besides, the sequence of various operations may be re-arranged. When the operations are completed, the processing may be terminated; besides, there may also include additional steps that are not included in the drawings. The processing may correspond to a method, a function, a specification, a sub-routine, a sub-program, etc.

The "computer device" herein (also referred to as "the computer") refers to a smart electronic device that may execute a predetermined processing process such as numerical computation and/or logic computation by running a predetermined program or instruction, which may comprise a processor and a memory, wherein the processor executes a program instruction prestored in the memory to execute the predetermined processing process, or executes the predetermined processing process using hardware such as ASIC, FPGA, and DSP, or executes by the combination of the two above. The computer device includes, but not limited to, a server, a personal computer (PC), a laptop computer, a tablet computer, a smart phone, and etc.

The computer device for example includes a user equipment and a network device. Particularly, the user equipment includes, but not limited to, a personal computer (PC), a laptop computer, and a mobile terminal, etc.; the mobile terminal includes, but not limited to, a smart phone, a PDA, and etc.; the network device includes, but not limited to, a single network server, a server group consisting of a plurality of network servers, or a cloud consisting a large number of computers or network servers based on cloud computing, wherein the cloud computing is a kind of distributed computing, i.e., a hypervisor consisting of a group of loosely coupled computer sets. Particularly, the computer device may operate to implement the present disclosure individually or may access to a network to implement the present disclosure through an interactive operation with other computer devices in the network. Particularly, the network where the computer device is located includes, but not limited to, the Internet, a Wide Area Network, a Metropolitan Area Network, a Local Area Network, a VPN network, etc.

It needs to be noted that the user equipment, network device, and network here are only examples, and other existing or future possibly emerging computer devices or networks, if applicable to the present disclosure, but also may be included within the protection scope of the present disclosure, which are incorporated here by reference.

The methods that will be discussed infra (some of which will be illustrated through flow diagrams) may be implemented through hardware, software, firmware, middleware, microcode, hardware descriptive language or any combination thereof. When they are implemented using software, firmware, middleware or microcode, the program codes or code segments for implementing essential tasks may be stored in a computer or computer readable medium (e.g., storage medium). (One or more) processors may implement essential tasks.

The specific structures and functional details disclosed here are only representative and intended to describe the exemplary embodiments of the present disclosure. Further, the present disclosure may be specifically implemented by a plurality of alternative modes and should not be construed to being only limited to the embodiments illustrated herein.

It should be understood that, although terms like "first" and "second" may be used here to describe respective units, these units should not be limited by these terms. Use of these terms are only for distinguishing one unit from another unit. For example, without departing from the scope of exemplary embodiments, a first unit may be referred to as a second unit, and likewise the second unit may be referred to as the first unit. The term "and/or" used here includes any and all combinations of one or more associated items as listed.

It should be understood that when a unit is referred to being "connected" or "coupled" to another unit, it may be directly connected or coupled to said another unit, or a medium unit may exist. In contrast, when a unit is referred to being "directly connected" or "directly coupled" to another unit, a medium unit does not exist. Other expressions (e.g., "located between . . . " vs. "directly located between . . . ," and "adjacent to . . . " vs. "directly adjacent to . . . ," etc.) for describing a relation between units should be construed in a similar manner.

The term used here is only for describing preferred embodiments, not intended to limit the exemplary embodiments. Unless otherwise indicated, a singular form "a(n)" or "one" used here is also intended to cover plurality. It should also be understood that the terms "comprise" and/or "include" as used here limit the presence of features, integers, steps, operations, units and/or components as stated, but do not exclude presence or addition of one or more other features, integers, steps, operations, units, components and/or combinations.

It should also be mentioned that in some alternative implementations, the functions/actions as mentioned may occur according to the sequences different from what are indicated in the drawings. For example, dependent on the functions/actions as involved, two successively indicated diagrams actually may be executed substantially simultaneously or sometimes may be executed in a reverse order.

It should be noted that the present invention may be implemented in software and/or a combination of software and hardware. For example, each module of the present invention may be implemented by an application-specific integrated circuit (ASIC) or any other similar hardware device. In one embodiment, the software program of the present invention may be executed through a processor to implement the steps or functions as mentioned above. Likewise, the software program (including relevant data structure) of the present invention may be stored in a computer readable recording medium, e.g., RAM memory, magnetic or optic driver or soft floppy or similar devices. Additionally, some steps or functions of the present invention may be implemented by hardware, for example, a circuit cooperating with the processor so as to implement various steps of functions.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims, instead of the above depiction. Thus, all variations intended to fall into the meaning and scope of equivalent elements of the claims should be covered within the present invention. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

Although exemplary embodiments have been specifically illustrated and described, those skilled in the art will understand that without departing from the spirit and scope of the claims, their forms and details may be varied. The protection as sought for here will be illustrated in the appended claims.

We claim:

1. A resource allocating method for an orchestrator for network slicing, comprising:
   uniformly incorporating, by the orchestrator, resources originally bundled statically with a base station into a dynamic resource pool, the incorporating including:
   when a new resource is available for the dynamic resource pool, obtaining a report that is initiated by a network device where the new resource is located, the report comprising capabilities and attributes of at least one of a radio access network (RAN) virtual network function (VNF), baseband unit (BBU), remote radio head (RRH), and antenna resource pool; and
   updating the dynamic resource pool based on the report; and
   allocating, by the orchestrator, resources from among the dynamic resource pool for the network slicing based on different network slicing requirements.

2. The resource allocating method according to claim 1, wherein in the allocating, resources serving different service types in the dynamic resource pool are allocated independent of each other.

3. The resource allocating method according to claim 2, wherein the resources include at least one of the following:
   a virtual network function,
   a baseband unit,
   a remote radio head, and
   an antenna.

4. The resource allocating method according to claim 1, wherein the method is adapted to network slicing of a radio access network.

5. The resource allocating method according to claim 1, wherein different network slicing includes at least one of the following:
   a network slicing for (eMBB) enhanced Mobile Broad Band, a network slicing for (mMTC) Massive Machine Type Communication, a network slicing for (uRLLC) Ultra-Reliable Low Latency Communication, and a network slicing for signaling for the basic coverage.

6. An orchestrator for network slicing in a wireless network, comprising:
   at least one processor; and
   at least one memory including non-transitory computer program code;
   wherein the at least one memory and the non-transitory computer program code are configured to, with the at least one processor, cause the orchestrator at least to perform:
   uniformly incorporating resources originally bundled statically with a base station into a dynamic resource pool, the incorporating including:
   when a new resource is available for the dynamic resource pool, obtaining a report that is initiated by a network device where the new resource is located, the report comprising capabilities and attributes of at least one of a radio access network (RAN) virtual network function (VNF), baseband unit (BBU), remote radio head (RRH), and antenna resource pool; and
   updating the dynamic resource pool based on the report; and
   allocating resources from among the dynamic resource pool for the network slicing based on different network slicing requirements.

7. The orchestrator according to claim 6, wherein the at least one memory and the computer program code are configured to, with the at least one processor, cause the orchestrator to further perform:
   allocating resources serving different service types in the dynamic resource pool independent of each other.

8. The orchestrator according to claim 7, wherein the resources include at least one of the following:
- a virtual network function,
- a baseband unit,
- a remote radio head, and
- an antenna.

9. The orchestrator according to claim 6, wherein the orchestrator is adapted to network slicing of a radio access network.

10. The orchestrator according to claim 6, wherein different network slicing includes at least one of the following:
- a network slicing for (eMBB) enhanced Mobile Broad Band,
- a network slicing for (mMTC) Massive Machine Type Communication,
- a network slicing for (uRLLC) Ultra-Reliable Low Latency Communication, and
- a network slicing for signaling for the basic coverage.

11. A wireless network, comprising:
an orchestrator for network slicing, the orchestrator including:
  at least one processor; and
  at least one memory including non-transitory computer program code;
  wherein the at least one memory and the non-transitory computer program code are configured to, with the at least one processor, cause the orchestrator at least to perform:
  uniformly incorporating resources originally bundled statically with a base station into a dynamic resource pool, the incorporating including:
    when a new resource is available for the dynamic resource pool, obtaining a report that is initiated by a network device where the new resource is located, the report comprising capabilities and attributes of at least one of a radio access network (RAN) virtual network function (VNF), baseband unit (BBU), remote radio head (RRH), and antenna resource pool; and
    updating the dynamic resource pool based on the report; and
  allocating resources from among the dynamic resource pool for the network slicing based on different network slicing requirements.

12. The wireless network according to claim 11, wherein the at least one memory and the computer program code are configured to, with the at least one processor, cause the orchestrator to further perform:
  allocating resources serving different service types in the dynamic resource pool independent of each other.

13. The wireless network according to claim 12, wherein the resources include at least one of the following:
- a virtual network function,
- a baseband unit,
- a remote radio head, and
- an antenna.

14. The wireless network according to claim 11, wherein the orchestrator is adapted to network slicing of a radio access network.

15. The wireless network according to claim 11, wherein different network slicing includes at least one of the following:
- a network slicing for (eMBB) enhanced Mobile Broad Band,
- a network slicing for (mMTC) Massive Machine Type Communication,
- a network slicing for (uRLLC) Ultra-Reliable Low Latency Communication, and
- a network slicing for signaling for the basic coverage.

* * * * *